United States Patent
Lightstone et al.

(10) Patent No.: US 7,277,581 B1
(45) Date of Patent: Oct. 2, 2007

(54) METHOD FOR VIDEO FORMAT DETECTION

(75) Inventors: Michael L. Lightstone, Fremont, CA (US); Stefan Eckart, Munich (DE)

(73) Assignee: NVIDIA Corporation, Santa Clara, CA (US)

( * ) Notice: Subject to any disclaimer, the term of this patent is extended or adjusted under 35 U.S.C. 154(b) by 800 days.

(21) Appl. No.: 10/642,673

(22) Filed: Aug. 19, 2003

(51) Int. Cl.
*G06K 9/00* (2006.01)

(52) U.S. Cl. ............ 382/181; 382/236; 382/278; 348/441; 348/526

(58) Field of Classification Search ........... 382/103, 382/106, 107, 151, 173, 181, 190, 199, 224, 382/232, 236, 254, 275, 278; 348/459, 558, 348/441, 448, 526, 96, 700, 439.1, 452, 443, 348/449, 415.1, 446; 375/240.12, 240.15; 386/111, 131, 129
See application file for complete search history.

(56) References Cited

U.S. PATENT DOCUMENTS

| | | | | |
|---|---|---|---|---|
| 5,341,142 A | * | 8/1994 | Reis et al. | 342/64 |
| 5,844,618 A | * | 12/1998 | Horiike et al. | 348/441 |
| 6,005,639 A | * | 12/1999 | Thomas et al. | 348/699 |
| 6,278,736 B1 | * | 8/2001 | De Haan et al. | 375/240.16 |
| 6,297,848 B1 | * | 10/2001 | Westerman | 348/448 |
| 6,563,550 B1 | * | 5/2003 | Kahn et al. | 348/700 |

* cited by examiner

*Primary Examiner*—Sheela Chawan
(74) *Attorney, Agent, or Firm*—Cooley Godward Kronish LLP

(57) ABSTRACT

The invention provide methods and code for better detecting 3:2 pulldown or other video formats. In one respect, embodiments of the invention improve the way in which fields of video data are compared. In another respect, embodiments of the invention provide pattern matching techniques and code for processing the field difference data.

10 Claims, 11 Drawing Sheets

FIG. 9

| Input Field Sequence $\{X_n\}$ | Observed 3:2 Phase $\{\theta_n\}$ | Field-Pair Formation |
|---|---|---|
| n:  01234567890123456... <br> Xn: aAbBbCcDdDeEfFfGg... <br> Note: no splice point | ----0----0----0--... | m:    0      1      2      3      4      5      6 <br> Ym: (X0,X1)(X2,X3)(X5,X6)(X7,X8)(X0,X1)(X2,X3)(X5,X6) <br> PF:   1      1      1      1      1      1      1 <br> RFF:  0      1      0      1      0      1      0 |
| n:  0123456789... <br> Xn: aAbBbCcDd... | ----0--0--... | m:    0      1      2      3 <br> Ym: (X0,X1)(X2,X3)(X5,X6)(X8,X9) <br> PF:   1      1      1      1 <br> RFF:  0      1      1      0 |
| n:  01234567890... <br> Xn: aAbBbCdDdEe... <br> Xn: aAbBbCdDdEe... | ----0---0--... <br> — | m:    0      1      2      3 <br> Ym: (X0,X1)(X2,X3)(X6,X7)(X9,X0) <br> PF:   1      1      1      1 <br> RFF:  0      1      1      1 |
| n:  012345678901... <br> Xn: aAbBbCcDdDeE... <br> Xn: aAbBbCdDeEfF... <br> Xn: aAbBbCcDdDeE... | ----0----0--... | m:    0      1      2      3      4 <br> Ym: (X0,X1)(X2,X3)(X5,X6)(X7,X8)(X0,X1) <br> PF:   1      1      *      1      1 <br> RFF:  0      1      0      1      0 |
| n:  0123456789012... <br> Xn: aAbBbCdDeEeFf... <br> Xn: aAbBbCdDeEeFf... <br> Xn: aAbBbCcDeEeFf... <br> Xn: aAbBbCcDeEeFf... | ----0-----0--... | m:    0      1      2      3      4 <br> Ym: (X0,X1)(X2,X3)(X6,X7)(X8,X9)(X1,X2) <br> PF:   1      1      0      1      1 <br> RFF:  0      1      1      1      0 |
| n:  01234567890123... <br> Xn: aAbBbCcDdEeEfF... <br> Xn: aAbBbCdDeeFfGg... <br> Xn: aAbBbCcDdEeEfF... <br> Xn: aAbBbCcDeFfGg... <br> Xn: aAbBbCcDdEeEfF... | ----0-------0--... | m:    0      1      2      3      4      5 <br> Ym: (X0,X1)(X2,X3)(X5,X6)(X7,X8)(X9,X0)(X2,X3) <br> PF:   1      1      *      *      1      1 <br> RFF:  0      1      0      0      1      0 |
| n:  012345678901234... <br> Xn: aAbBbCdDeEfFfGg... <br> Xn: aAbBbCcDeEfFfGg... <br> Xn: aAbBbCcDeEfFfGg... <br> Xn: aAbBbCcDdEfFfGg... | ----0-------0--... | m:    0      1      2      3      4      5 <br> Ym: (X0,X1)(X2,X3)(X5,X6)(X8,X9)(X0,X1)(X3,X4) <br> PF:   1      1      *      1      1      1 <br> RFF:  0      1      0      1      1      0 |
| n:  0123456789012345... <br> Xn: aAbBbCcDdEeFfGg... <br> Xn: aAbBbCcDeFfGgGhH... <br> Xn: aAbBbCcDdEeFfGg... | ----0---------0--... | m:    0      1      2      3      4      5      6 <br> Ym: (X0,X1)(X2,X3)(X5,X6)(X7,X8)(X9,X0)(X1,X2)(X4,X5) <br> PF:   1      1      1      *      1      1      1 <br> RFF:  0      1      0      0      0      1      0 |
| n:  01234567890123456... <br> Xn: aAbBbCcDeEfFgGgHh... <br> Xn: aAbBbCcDdFgGhHhIi... | ----0----------0--... | m:    0      1      2      3      4      5      6 <br> Ym: (X0,X1)(X2,X3)(X5,X6)(X7,X8)(X0,X1)(X2,X3)(X5,X6) <br> PF:   1      1      1      *      *      1      1 <br> RFF:  0      1      0      0      1      1      0 |
| n:  012345678901234567... <br> Xn: aAbBbCcDdFfGgHhHiI... | ----0-----------0--... | m:    0      1      2      3      4      5      6      7 <br> Ym: (X0,X1)(X2,X3)(X5,X6)(X7,X8)(X9,X0)(X1,X2)(X3,X4)(X6,X7) <br> PF:   1      1      1      1      1      1      1      1 <br> RFF:  0      1      0      0      0      0      1      0 |

Key

| Symbol | Meaning |
|---|---|
| Xn | Input field sequence with field index n. |
| Ym | Output field-pair sequence with field-pair index m. |
| (Xj,Xk) | A field pair consisting of field Xj and Xk. |
| PF | The *progressive_frame* flag. |
| RFF | The *repeat_first_field* flag. |
| * | Use the frame difference ($D_{n,n-1}$) to set the *progressive_frame* flag to 1 if the frame difference is small. |
| 0 | A telecine phase of zero. |
| - | A non-zero telecine phase. |
| aAbBb | First field sequence. Lower case and upper case letters of the same letter correspond to even and odd fields of a single film frame. |
| gGgHh | Second field sequence. Lower case and upper case letters of the same letter correspond to even and odd fields of a single film frame. |

210

```
Init:

n = 1;
m = 0;

Start:

Get C[n] and θ[n] from Pattern Matching Engine;
availableFields = m - n;

if (availableFields >= 2) {
    fieldOut0 = X[n];
    fieldOut1 = X[n-1];
    repeat_first_field = false;
    progressive_frame = false;

if (C[n] == VIDEO) {
        m = m + 2;
    }
    else {
        if (availableFields == 3) {
            repeat_first_field = true;
            progressive_frame = true;

if( θ[n-2] !=0 AND θ[n+1] != 0 AND θ[n+3] != 0) {
                fieldOut0 = X[n-1];
                fieldOut1 = X[n-2];
            } m = m + 3;
        }
        if (availableFields == 2) {
            if( θ[n-1] !=0 AND θ[n+1] != 0 AND θ[n+2] !=0 AND θ[n+4] != 0) {
                progressive_frame = true;
                m = m + 2;
            }
            else {
                n = n + 1;
                goto Start;
            }
        }
        if (C[n] == FILM_IN_TRANSITION) {
            if ((D(field0, field1) > threshold) OR ( θ[n-3] == 0 AND θ[n+3] == 0)) {
                progressive_frame = false;
            }

Output( fieldOut0, fieldOut1, repeat_first_field, progressive_frame );
    }
} n = n + 1;
goto Start;
```

FIG. 11

METHOD FOR VIDEO FORMAT DETECTION

BACKGROUND

The invention relates generally to the field of data processing. More specifically, the invention relates to a method for detecting the format of video data and processing the video data based on the detected format.

Various formats exist for television data. Much of the National Television System Committee (NTSC) formatted content broadcast on terrestrial or cable television is entirely or partially shot on film (movies, sitcoms, music videos, commercials, etc.) and then later converted to NTSC video format by 3:2 pulldown. 3:2 pulldown is the process by which 24 frames/sec film content is converted into 59.94 fields/sec video. As used herein, "3:2 content," "3:2 pulldown clips," "3:2 sequences," and "telecine sequences" indicate video data that was generated from film using the 3:2 pulldown process. "Standard video" will be used to indicate video data that did not originate from film.

When converting from film to video using the 3:2 pulldown process, two film frames, 102 and 104, generate five interlaced video fields, 106, 108, 110, 112 and 114, as depicted in FIG. 1. In addition, the film speed is slowed down by 0.1% to 23.976 (24/1.001) in order to account for the fact that NTSC video runs at 29.97 frames/sec. The process of converting from 3:2 content back to film is called inverse 3:2 pulldown (also known as inverse telecine).

The two primary applications of inverse 3:2 pulldown are display and compression. In terms of display, inverse 3:2 pulldown facilitates the optimal display of film content on a progressive monitor (such as a large-screen rear-projection system, a liquid crystal display, or a flat panel plasma display) because it allows each film frame to be displayed in its original progressive form for a uniform and consistent duration of 1/24th of a second. In terms of compression, inverse 3:2 pulldown results in better compression efficiency and reduced computational complexity in a video encoder because it allows telecine content to be encoded at 24 frames/sec format rather than at 59.94 fields/sec.

Known methods can detect 3:2 content and extract the original film frames where the repeated field pattern is uninterrupted and distinct. However, there are several factors that produce unreliable results in known systems and methods for detecting 3:2 content or other video formats.

For example, known techniques do not reliably distinguish between repeated fields and non-repeated fields when the motion of objects is very small (providing little field-to-field positional difference) and/or the video noise is high. Moreover, it is not uncommon that Digital Video Disks (DVD's) and other video sources contain both standard video and 3:2 content In such cases, it is difficult for known algorithms to detect the location of standard video/3:2 content transitions and respond accordingly. In addition, with known techniques, standard video that is inverted can result in highly objectionable artifacts resulting from weaving two fields from different time instants. Moreover, the phase of the 3:2 pulldown pattern may change when two different 3:2 pulldown clips are spliced together, e.g., at a scene transition. Ambiguous situations arise, for example, when one 3:2 pulldown clip is transitioned to another 3:2 pulldown clip via a fade. This editing can result in the superposition of two 3:2 patterns with different phases, which cannot be unambiguously inverted using known methods. Furthermore, some content providers broadcast 60 fields/sec video that has been generated using a non-standard 3:2 pulldown approach. One example of such a process is varispeed, which alters the run time of a program. Simply repeating film frames would cause stutter, so, instead, the 3:2 pattern is modified to ensure a smooth temporal rate. Known detection methods are ill-suited to detect such non-standard video formats.

Therefore, a need exists for a system and method that can produce more reliable detection of video format where, for example, the source video is noisy, or where the video data pattern is interrupted by the use of splices or transitions, or where the video is otherwise altered by a content provider.

SUMMARY OF THE INVENTION

The invention provides methods and code for better detecting 3:2 content or other video formats. In one respect, embodiments of the invention improve the way in which fields of video data are compared to each other. In another respect, embodiments of the invention provide pattern matching techniques and code for processing the field difference data that results when video data is compared. In yet another respect, embodiments of the invention facilitate the formation of field pairs required by the inverse telecine process.

The features and advantages of the invention will become apparent from the following drawings and detailed description.

BRIEF DESCRIPTION OF THE DRAWINGS

Embodiments of the invention are described with reference to the following drawings, wherein:

FIG. 9 is an illustration of possible telecine phases and field pair formations, according to one embodiment of the invention;

FIG. 11 is an illustration of pseudo-code description of field-pair formation, according to one embodiment of the invention.

DETAILED DESCRIPTION

Figure 2:
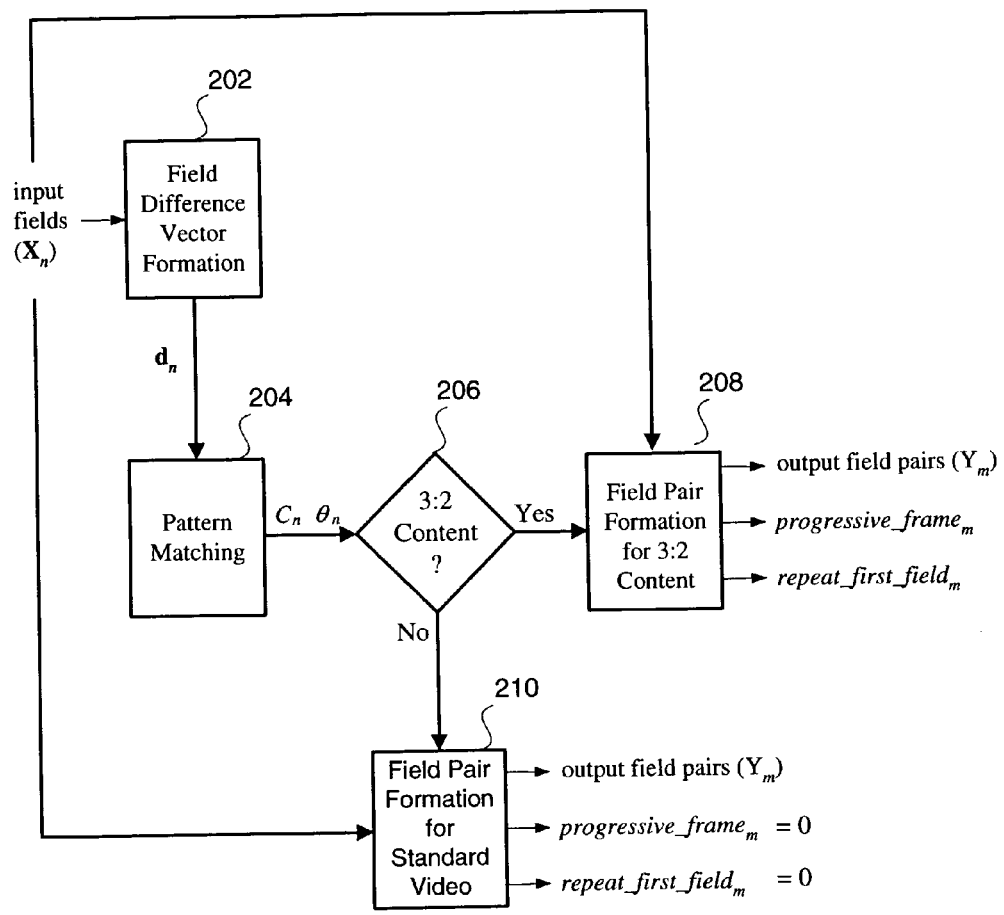
FIG. 2 is a block diagram of a video format detection algorithm, according to one embodiment of the invention.

This section describes stages of an inverse telecine process: field-difference vector formation, pattern matching, and two alternative stages for field-pair formation. A top-level block diagram of the overall process is shown in FIG. 2.

Input fields ($X_n$) are fields of a video data stream. Output field pairs ($Y_m$) are fields of a video signal that have been paired for the purpose of producing film frames as part of an inverse telecine process. The process depicted in FIG. 2 advantageously discriminates between 3:2 content and standard video.

Figure 1:
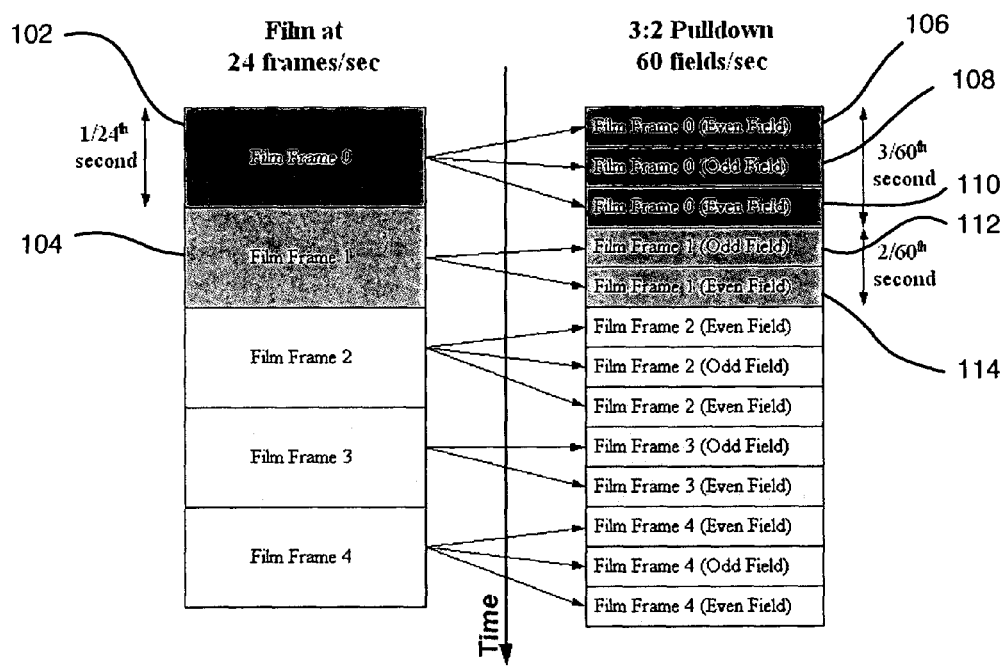
FIG. 1 is an illustration of 3:2 pulldown, according to the related art.

Field-difference vector formation 202 is used to identify repeated fields in the video data stream, such as film frame 0 (even field), film frame 2 (even field), and field frame 4 (even field) in FIG. 1. The output can be expressed as a vector $d_n$. Pattern matching step 204 is a technique for comparing a sequence of field differences to known data formats. The output of the pattern matching step 204 is state variable, $C_n$, and a phase estimate, $\theta_n$. $C_n$ is used in conditional step 206 to determine whether the video data is 3:2 content. $\theta_n$ describes the phase of 3:2 content.

If it is determined in conditional step 206 that the input is 3:2 content, then the process advances to field pair formation step 208 to pair output fields related to frames of film. For example, with reference to FIG. 1, video fields 112 and 114 might be paired. In addition, field pair formation step 208 sets a progressive frame flag and a repeat first field flag. The progressive frame flag indicates a pair of output fields to be used in generating a frame of film. The repeat first field flag indicates a field pair having a repeated first field. For instance, with reference to FIG. 1, the repeat first field flag would be set for the field pair consisting of fields 106 and 108 to indicate that there was a repeated first field 110 in the 3:2 content.

If it is determined in conditional step 206 that the input is standard video, then the process advances to step 210 for the output of video field pairs. In this instance, the progressive frame flag and the repeat first field flag are set to zero, since they are only applicable to 3:2 content.

Each of the steps depicted in FIG. 2 and described below may be used separately, or combined with the other steps described herein. Process steps may also be combined with other format detection algorithms. Moreover, the techniques described used herein are applicable to processing operations other than inverse telecine processing.

The sub-headings used below are for organizational convenience, and are not meant to limit the disclosure of any particular feature to any particular portion of this specification.

Field-Difference Vector Formation (Step 202)

Figure 3:
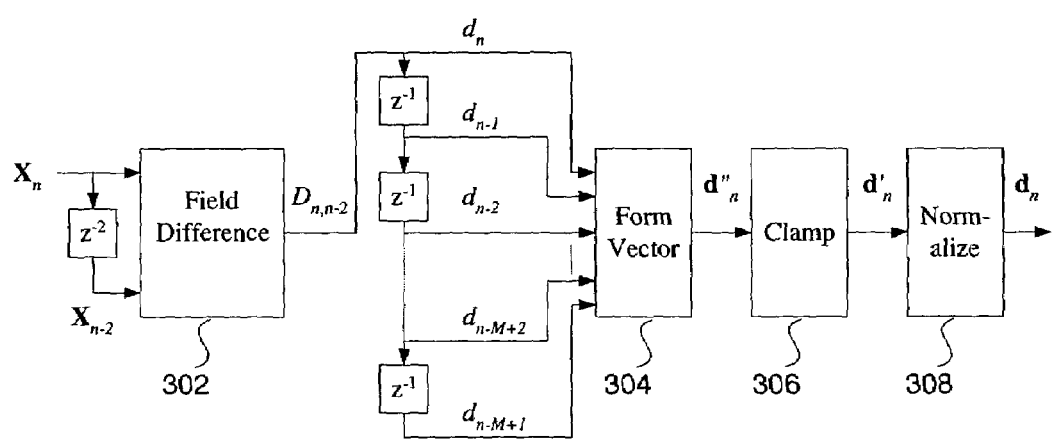
FIG. 3 is a block diagram of a field difference vector formation algorithm, according to one embodiment of the invention.

This section describes the formation of a field-difference vector sequence, $\{d_n\}$, which is formed from an input field sequence $\{X_n\}$. The purpose of the field difference sequence $\{d_n\}$ is to identify repeated fields in 3:2 content. As shown in FIG. 3, the field difference sequence $\{d_n\}$ may be obtained by executing field difference step 302, vector formation step 304, clamping step 306 and normalization step 308 in series. A more detailed description of each is provided below.

Field Difference (Step 302)

The field difference step 302 operates on two input fields, $X_n$ and $X_{n-2}$, and outputs a field-difference metric, $D_{n,\,n-2}$.

Figure 4:
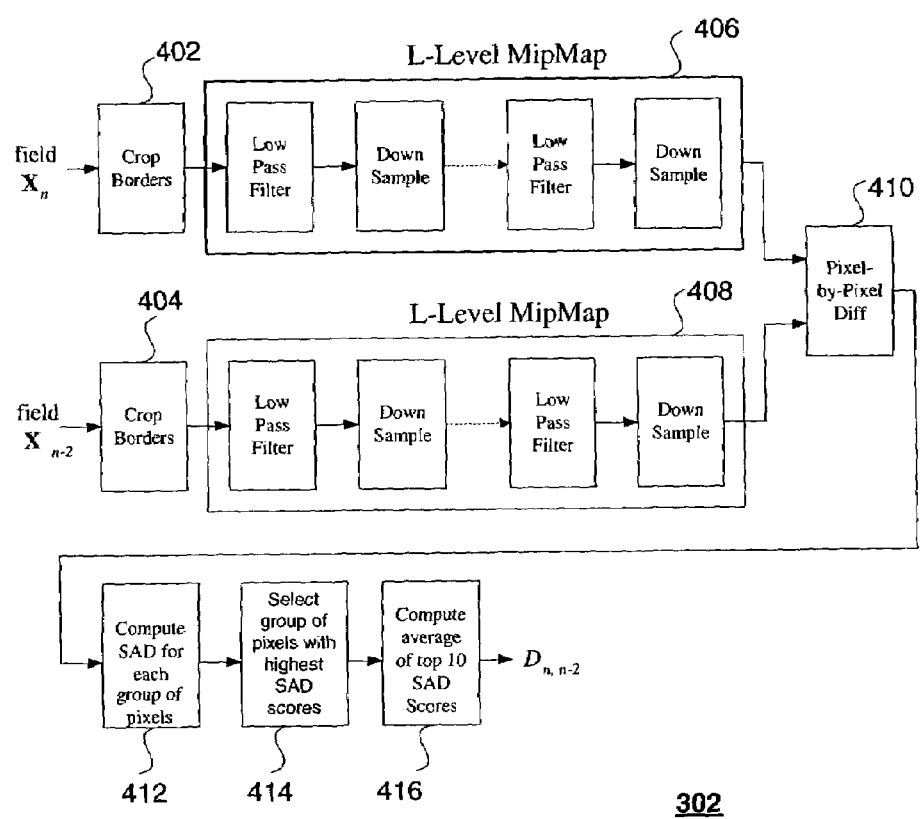
FIG. 4 is a block diagram of a field difference engine algorithm, according to one embodiment of the invention.

The difference metric $D_{n,\,n-2}$ is a single scalar value that indicates the "closeness" of the two fields. The smaller the value, the more likely the two input fields are duplicates. A simple sum of absolute pixel-by-pixel differences between two input fields may not suffice as a mechanism to distinguish repeated and non-repeated fields because it cannot sufficiently discriminate slight motion (indicating a non-repeated field) from noise. An improved field difference engine, according to one embodiment of the invention shown in FIG. 4, addresses this concern.

First, in optional pre-processing steps 402 and 404, the input fields are cropped at the left, right, top and bottom to avoid edge artifacts. To mitigate the effects of slight motion and noise, we filter and sub-sample each input field by a factor of L in the horizontal and vertical dimension, where L is a power of 2. See steps 406 and 408. This is implemented by treating the input field as a texture and creating an L-level mipmap with a simple two-tap averaging filter (although more sophisticated filtering is also possible). The final mipmap level is used to compute the field-difference. Filtering and sub-sampling in steps 406 and 408 also reduce the number of Central Processing Unit (CPU) cycles required to compute the field difference.

Next, the image is segmented into pixel groups (step not shown), and pixel-by-pixel differences are determined between fields $X_n$ and $X_{n-2}$ in step 410. In one embodiment, the pixel groups are blocks having W×H pixels, for example 32×16 pixels.

In step 412, the sum of absolute pixel differences (SAD) between the two fields is computed for each group of pixels. For sequences with small amounts of motion, only a few groups of pixels may exhibit large field-to-field differences. Consequently, in one embodiment, the pixel group scores are selected in step 414, and only the scores of the top ranked groups of pixels, e.g., the top 10%, are combined and used to compute the field difference metric, $D_{n,\,n-2}$, in step 416.

Optimum pixel group size and pixel group selection rules can be determined empirically. By selecting and using a small subset of the pixel groups, the algorithm can more easily distinguish slight motion from noise. In another embodiment, each of the pixel group scores may be compared to a predetermined threshold value to sort the pixel group scores. In yet another alternative embodiment, all pixel group scores are used.

Thus, by calculating field difference using blocks or other pixel groups, field differences can be detected, even where, for example, most of the background is unchanged.

Field Difference Vector Processing (Steps 302, 304, 306, and 308)

Since the spacing between repeated fields for 3:2 telecine content is 2, the expectation is that (relatively speaking), $D_{n,n-2}$ will be small for repeated fields and large otherwise. Accordingly, we construct a repeat-field-difference sequence, $d_n$, where $d_n = D_{n,n-2}$.

As an intermediate step 304, we form a corresponding vector sequence of length M difference vectors, given by $d''_n = [d_n, d_{n-1}, \ldots d_{n-M+1}]^T$. Next we construct the vector sequence $d'_n$ in step 306 by clamping the outlier field differences in the vector $d''_n$. More specifically, define $d^*_n$ as the $N^{th}$ largest element of $d''_n$. Then, we construct $d'_n$ according to:

$$d'_n(i) = \begin{cases} d''_n(i) & \text{if } d''_n(i) \le d^*_n \\ d^*_n & \text{if } d''_n(i) > d^*_n \end{cases}.$$

Finally, in step 308, we scale these vectors to zero-mean and unit variance, resulting in the normalized vector sequence, $d_n$, which is computed according to:

$$d_n = \frac{d'_n - 1 \cdot \mu_{d'_n}}{\sigma_{d'_n}}.$$

In vector notation, the mean and standard deviation of a vector, v, are defined as $\mu_v = 1^T v$ and $\sigma_v^2 = (v - 1 \cdot \mu_v)^T (v - 1 \cdot \mu_v)$, respectively, where $1 = [1, 1, \ldots 1]^T$.

Pattern Matching (Step 204)

The goal of the pattern matching step 204 is to make an accurate 3:2 content/standard video decision, $C_n$, and a phase estimate, $\theta_n$, which describes a position within a known pattern. In one embodiment of step 204, basis vectors are used to describe known patterns of 3:2 content and standard video formats.

Many existing inverse 3:2 techniques limit their observations to one or two field differences when detecting 3:2 content. Often, the repeat field decision is based on a simple threshold of the field difference, which is very susceptible to noise. For this type of approach, it is difficult to strike a balance between responding quickly to 3:2 content/standard video transitions and inadvertently responding when no transition really exists due to noisy measurements. As a result, clumsy heuristics are often required to prevent an algorithm from incorrectly switching back and forth between standard video and 3:2 content.

In contrast with existing techniques, embodiments of pattern matching step 204 observe a large history of field differences over a given window of the repeat-field-difference sequence, $\{d_n\}$. Considering a large number of field differences simultaneously mitigates the effects of noise and affords a larger context for the algorithm to operate. In addition, by introducing a small delay, the algorithm can look into the past as well as the future when making the 3:2 content/standard video decision and determining the 3:2 phase. Moreover, by considering all possible translations of the window within the sequence of field differences, the algorithm can often pin point the location of 3:2 content/3:2 content or standard video/3:2 content transitions more precisely.

Figure 5:
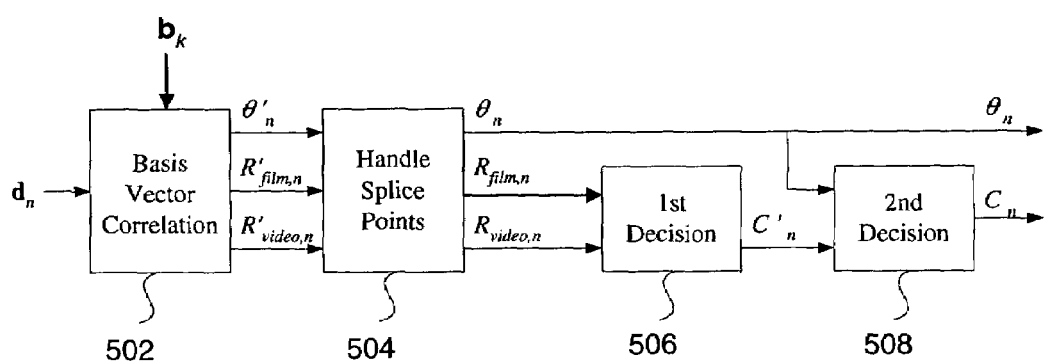
FIG. 5 is a block diagram of a field-difference pattern matching algorithm, according to one embodiment of the invention.

The embodiment of step 204 illustrated in FIG. 5 includes a correlation step 502, a step for handling splice points 504, a first decision step 506, and a second decision step 508, all coupled in series. Steps 502, 504, 506 and 508 may be used separately or in combination, and are described further below.

Overview of Correlation (Step 502)

Figure 6:
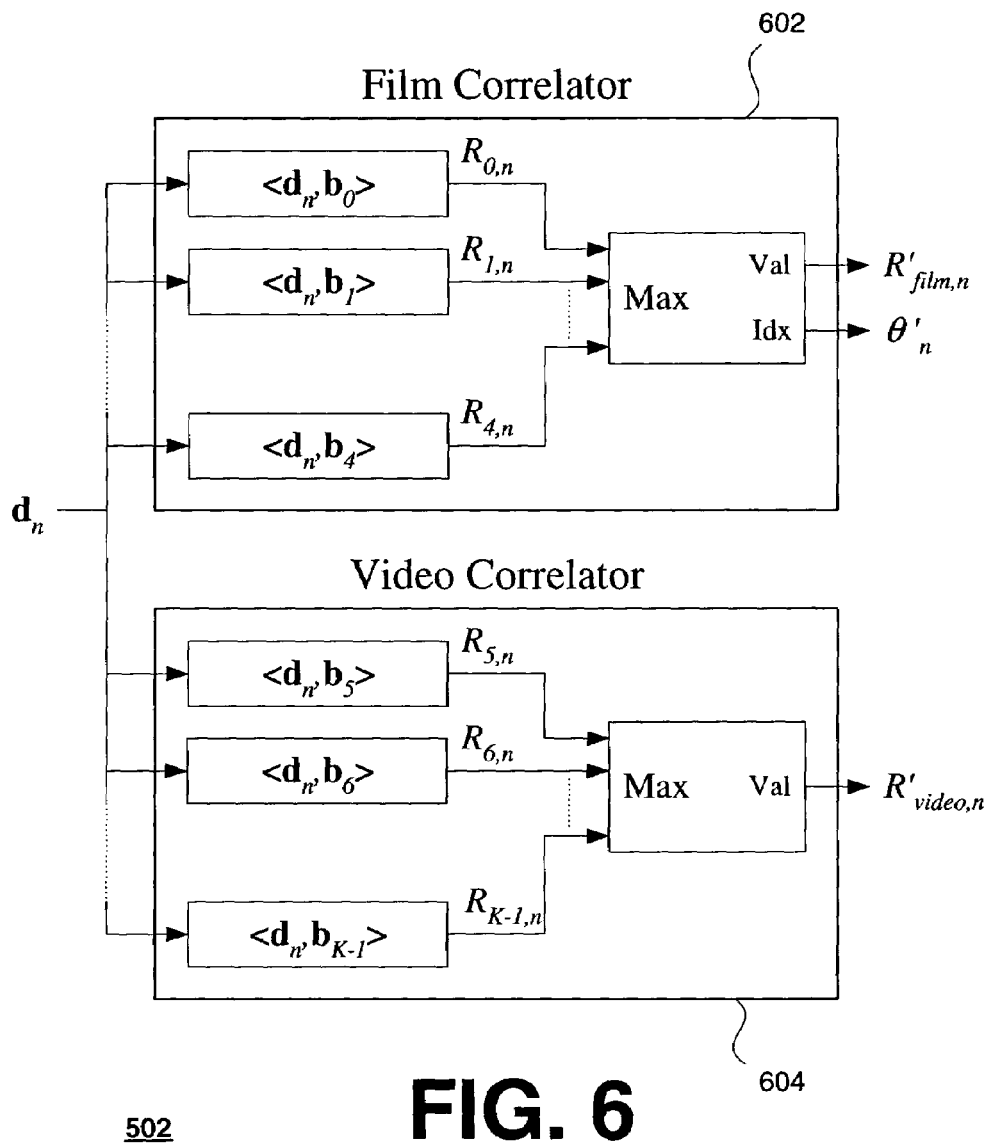
FIG. 6 is a block diagram of a correlation engine, according to one embodiment of the invention.

In an embodiment of correlation step 502 illustrated in FIG. 6, the normalized field difference sequence, $d_n$, is fed into a bank of K correlators for film 602 and video 604, resulting in K output sequences given by $\{R_{0,n}, R_{1,n}, \ldots, R_{K-1,n}\}$. Mathematically, we compute the output, $R_{k,n}$, of the field difference sequence with correlator k by taking an inner product of vector $d_n$ with the basis vector, $b_k$, according to $$R_{k,n} = \langle d_n, b_k \rangle .$$
$$= d_n^T b_k$$

Recall the Cauchy-Schwarz Inequality, which states $\langle x, y \rangle \leq \|x\| \cdot \|y\|$. By normalizing both the field difference and basis vectors, i.e., $\|d_n\| = \|b_k\| = 1.0$, we can constrain the correlation output range such that $R_{k,n} \leq 1.0$. The goal of normalization is to keep $R_{k,n}$ invariant to changes in the relative quantity and size of motion in the input video fields.

Basis Vector Construction

The K basis vectors, $\{b_0, b_1, \ldots b_{K-1}\}$, correspond to each of the correlators 602 and 604 and are constructed to be of zero-mean and unit standard deviation. In one embodiment, the basis vector length, M, is assumed to be a multiple of 5, corresponding to the field difference period of telecine content.

The first five of these basis vectors, $\{b_0, b_1, \ldots, b_4\}$, represent the "idealized" repeat field patterns for the five possible phases of 3:2 content, and the remaining K-5 vectors, $\{b_5, b_6, \ldots, b_{K-1}\}$, represent the repeat field patterns for standard video.

In both cases, the normalized basis vectors are derived from the vectors, $\{b'_0, b'_1, \ldots, b'_{K-1}\}$, whose elements are restricted to the values 0.0 or 1.0. The normalized basis vectors, $\{b_0, b_1, \ldots, b_{K-1}\}$, are computed by scaling the vectors, $\{b'_0, b'_1, \ldots, b'_{K-1}\}$, to zero mean and unit variance, according to:

$$b_k = \frac{b'_k - 1 \cdot \mu_{b'_k}}{\sigma_{b'_k}}.$$

For 3:2 content, the five un-normalized basis vectors $\{b'_0, b'_1, \ldots, b'_4\}$ are constructed by considering the five possible phases of telecine content and assigning 0.0 to the locations for each repeat field, and 1.0 otherwise. For example, for M=10, the un-normalized vectors $\{b'_0, b'_1, \ldots, b'_4\}$ are given by:

$b'_0 = [0,1,1,1,0,1,1,1,1]^T$ $b'_1 = [1,0,1,1,1,1,0,1,1,1]^T$ $b'_2 = [1,1,0,1,1,1,1,0,1,1]^T$ $b'_3 = [1,1,1,0,1,1,1,1,0,1]^T$ $b'_4 = [1,1,1,1,0,1,1,1,1,0]^T$

For standard video, the un-normalized video basis vectors, $\{b'_5, b'_6, \ldots, b'_{K-1}\}$, are constructed by considering a subset (or potentially all) of the remaining, non-zero combinations of 0.0 and 1.0. For example, if M=10, we have $K = 2M - 1 = 1023$ possible non-zero combinations of 0.0 and 1.0, resulting in un-normalized vectors given by $\{b'_5, b'_6, \ldots, b'_{1022}\}$.

Basis Vector Correlation (Step 502)

To determine whether the input fields are 3:2 content or standard video, we generate 3:2 content and standard video confidence metrics by selecting the maximum outputs from the respective banks of film and video correlators according to:

$$R'_{film,n} = \max_{0 \leq k < 5} \{R_{k,n}\},$$

and $$R'_{video,n} = \max_{5 \leq k < K} \{R_{k,n}\}.$$

These values are simply the correlation outputs for the best 3:2 content and standard video basis vector matches, and in a sense, can be viewed as likelihood measures for 3:2 content and standard video. We similarly record the index for the best 3:2 content basis vector (corresponding to $R'_{film,n}$) according to:

$$\theta'_n = \arg \max_{0 \leq k < 5} \{R_{k,n}\},$$

which can be viewed as a first-pass estimate of the 3:2 phase for 3:2 content.

Accordingly, by expanding the window of consideration, and by comparing the field difference sequence to 3:2 content basis vectors and/or standard video basis vectors, a more reliable prediction can be made for identifying the format of the source video data.

Handling Splice Points (Step 504)

A good match with a 3:2 content basis vector requires an uninterrupted history of telecine content over the duration of the field-difference vector window. Edit or splice points between two telecine sequences may violate this requirement if the 3:2 content/3:2 content transition disrupts the normal 3:2 pattern. Across such a splice point, a good match with one of the 3:2 content basis vectors is not possible since the transition causes a discontinuity in the expected repeat-field difference pattern.

Figure 7:
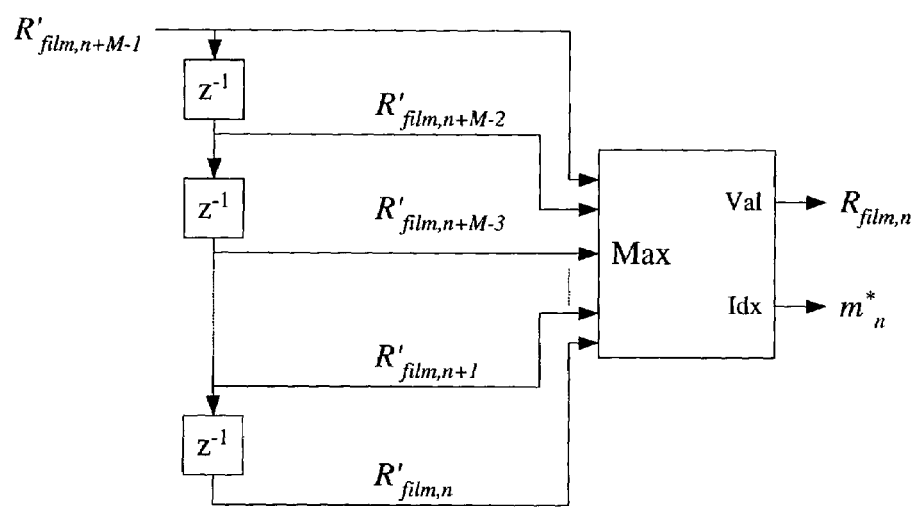
FIG. 7 is a block diagram of film confidence calculation, according to one embodiment of the invention.

To remedy the problem of detecting 3:2 across a splice point, according to one embodiment of the step for handling splice points 504 detailed in FIG. 7, we calculate an improved 3:2 content confidence metric, $R_{film,n}$, by finding the best basis vector match over a sliding window of length M according to:

$$R_{film,n} = \max_{0 \leq m < M} \{R'_{film,n+m}\},$$

This approach guarantees at least one good basis vector match if splice points are separated by at least M fields. The index corresponding to the best translation given by:

$$m_n^* = \arg \max_{0 \leq m < M} \{R'_{film,n+m}\},$$

can be used to improve the 3:2 phase estimate by using the original phase estimate corresponding to $R_{film,n}$ and adjusting it by the delay, $m^*_n$, according to:

$$\theta_n = \mod(\theta'_{n+m^*_n} + M - m^*_n, 5)$$

Note that the search over a sliding window of size M introduces a delay of M fields to the overall inverse 3:2 processing.

For standard video, there is no need to search over all possible sliding windows, so instead we define $R_{video,n}$ by selecting the best basis vector match using a window centered at time n, i.e., $$R_{video,n} = R'_{video,n+M/2}.$$

Thus, pattern matching against a set of possible splice vectors significantly improves the ability of algorithms to detect splice edits in the source video. As illustrated above, the phase index can also be determined with this technique.

1$^{st}$ and 2$^{nd}$ Decision (Steps 506 and 508)

To determine whether the input fields belong to film or video content, the inverse 3:2 algorithm applies a variety of heuristics to the relative and absolute magnitudes of the phase confidences, $R_{film,n}$ and $R_{video,n}$, the consistency of the phase estimates, $\theta_n$, the presence of dropped frames, and past mode decisions. In the embodiment illustrated in FIG. 5, these inputs are fed into a two-pass algorithm whose output is a 3:2 content/standard video decision, delineated by $C_n$, that takes on one of three values: 3:2 content (FILM); 3:2 content in transition (FILM IN TRANSITION); and, standard video (VIDEO). The output $C_n$, along with the film phase estimate $\theta_n$, determine how the input fields are processed into output fields or frames (as described below).

1$^{st}$ Decision (Step 506)

Figure 8:
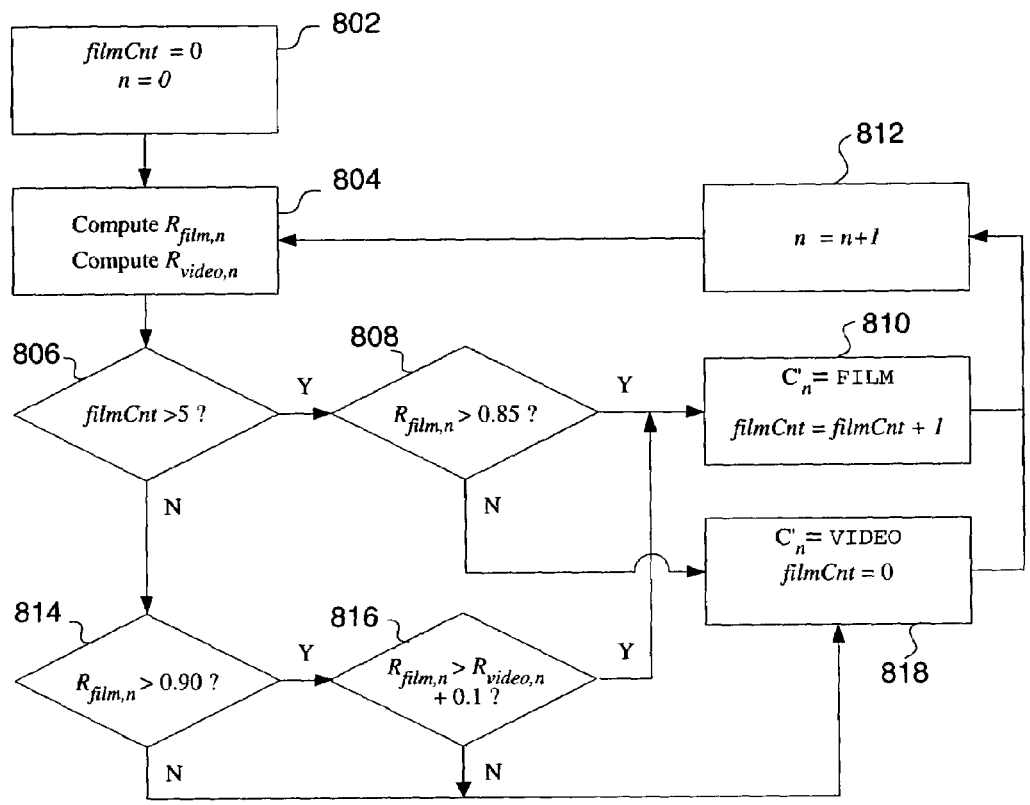
FIG. 8 is a process flow diagram for a first stage of 3:2 content/standard video decision, according to one embodiment of the invention.

The 1$^{st}$ decision step 506 uses phase confidences, $R_{film,n}$ and $R_{video,n}$, to make an initial 3:2 content/standard video determination delineated by $C'_n$. A flow chart describing the logic for this stage, according to one embodiment of step 506 is shown in FIG. 8.

As shown therein, the process begins in step 802 by processing the first input field in temporal order and initializing a counter, filmCnt, to zero. The counter filmCnt increments by one in step 810 for each successive field of 3:2 pulldown encountered and is reset to zero in step 818 whenever a field is determined to be standard video.

For each input field indexed by n, the 3:2 content and standard video phase confidence, $R_{film,n}$ and $R_{video,n}$, respectively, are computed in step 804. If a 3:2 pattern has been observed for more than 5 fields in step 806, then the film confidence, $R_{film,n}$, is simply compared against a threshold in step 808 to determine whether the latest field is still part of a 3:2 pulldown sequence, or whether the content has reverted to standard video. If a 3:2 pattern has been observed for less than 5 fields in step 806, then the algorithm requires more stringent requirements to be met in steps 814 and 816. First, the film confidence, $R_{film,n}$, is compared against a larger threshold in step 814. If the film confidence is larger than this threshold, the film confidence is then compared against the standard video confidence, $R_{video,n}$, in step 816 to determine whether the latest field is still 3:2 content or has reverted to standard video. After each field is processed, the field counter is incremented in step 812 and the next field in temporal order is processed.

2$^{nd}$ Decision (Step 508)

To better handle 3:2 content/3:2 content and 3:2 content/standard video transitions, one embodiment of the invention uses an additional five field delay in the 2$^{nd}$ decision step 508 so that we can consider future as well as past film phase estimates, dropped frame discontinuities and 3:2 content/standard video decisions, $C'_n$, from the 1$^{st}$ decision step 506 described above. The five field delay corresponds to the repeated field period of 3:2 content and adds to the M field delay already introduced with reference to handling splice points above. The output of the 2$^{nd}$ decision step 508 is given by $C_n$.

Before declaring that the current field belongs to 3:2 content, the 2$^{nd}$ decision step 508 checks the "consistency" of the phase estimates and past 3:2 content/standard video decisions over a sliding window that includes past and future fields. Specifically, we define $W_n$ as window of field indices given by:

$$W_n = \{i : I_{start,n} \leq i < I_{end,n}\},$$

where $I_{start,n}$ is the index of the most recently observed repeated field and $I_{end,n}=5$. In other words, the window starts at the last previously detected repeat field (when $\theta_n=0$) and ends five fields in the future. For field n, the 3:2 phase estimate, $\theta_n$, is said to have incremented consistently if $\mod(\theta_n+5-\theta_{n-1}, 5)=0$, which essentially means that the 3:2 phase estimates are incrementing in the manner consistent with 3:2 content. If 1) no dropped frames are detected, 2) all the phases are consistent over the window, $W_n$, and 3) $C'_n$=FILM for all fields in $W_n$, then $C_n$ is determined to be 3:2 content. If a single phase inconsistency or a single dropped frame is detected, the decision is 3:2 content in transition, and otherwise the decision is standard video. Accordingly, any one or more of pattern matching steps 502, 504, 506, and 508 may be used to determine in step 206 whether the input is 3:2 content. 3:2 content and 3:2 content in transition are promoted to field pair formation step 208. Standard video is promoted to field pair formation step 210.

Field-Pair Formation for 3:2 Content (Step 208)

3:2 content and 3:2 content in transition are processed in step 208. Step 208 uses the mode decision, $C_n$, and phase estimate, $\theta_n$, from the output of the pattern matching step 204 to determine the pairing of the output fields and to set the repeat_first_field and progressive_frame flags.

As we mentioned earlier, this process is rather straightforward if the 3:2 pulldown pattern is uninterrupted. However, for splice points, the proper pairing and flag selection is more challenging. A feature of this stage of the processing is that all possible splice points are considered. In one embodiment, step 208 is executed in accordance with the table illustrated in FIG. 9.

As shown therein, column 902 shows input field sequences $\{X_n\}$ for each of ten possible phase sequences $\{\theta_n\}$ shown in column 904. Except for the first row, all listed input field sequences $\{X_n\}$ in column 902 represent possible splice points between two 3:2 pulldown clips. For each possible input field sequence $\{X_n\}$ shown in column 902, an optimal series of output field pairs $Y_m$ is provided in column 906, together with appropriate states for the progressive frame flag and the repeat first field flag.

One embodiment of field pair formation step 208 identifies an input field sequence $\{X_n\}$ as one of the possible input field sequences $\{X_n\}$ listed in column 902 in order to form an appropriate field pair sequence $Y_m$, and in order to set the progressive frame flags and the repeat first field flags according to the corresponding solution provided in column 906.

In the alternative, or in combination, an embodiment of field pair formation step 208 identifies an input field sequence $\{X_n\}$ having a phase sequence $\{\theta_n\}$ illustrated by one of the cases shown in column 904 in order to form an appropriate field pair sequence $Y_m$ and the progressive frame flags and the repeat first field flags according to the corresponding solution provided in column 906.

Field-Pair Formation for Standard Video (Step 210)

Figure 10:
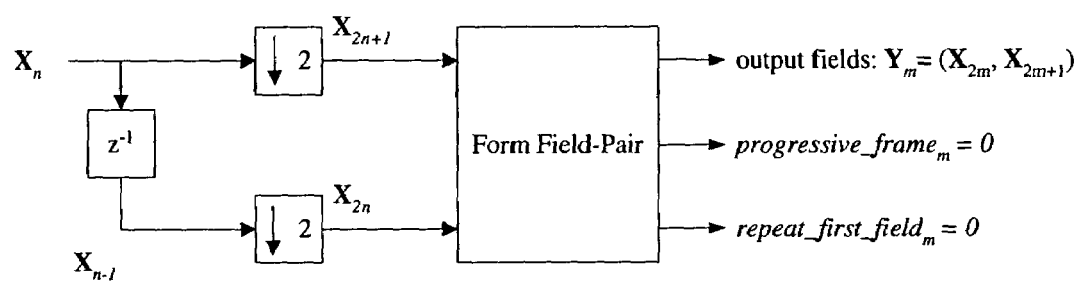
FIG. 10 is a block diagram of an algorithm for field pair formation, according to one embodiment of the invention.

Standard video is processed in step 210. In one embodiment, step 210 is executed in accordance with the process depicted in FIG. 10. As shown therein, a first field $X_n$ and a second field $X_{n-1}$ are offset to generate $X_{2n+1}$ and $X_{2n}$, respectively. Thus, for input data of $X_0, X_1, X_2, X_3$, etc., the output field pairs would be $Y_0=(X_0,X_1), Y_1=(X_2,X_3)$, etc. In the case of standard video, the progressive frame flag and the repeat first field flag are not applicable and are set to zero.

Steps 206, 208, and 210

Any and all of the methods and algorithms described above can be implemented via software. The software can be programmed in a variety of languages, and stored in a variety of formats, for processing by a video preprocessor or other processor capable of executing the software.

FIG. 11 illustrates pseudo code to implement one embodiment of conditional step 206 and field pair formation steps 208 and 210. As shown therein, $C_n$ and $\theta_n$ are read. If $C_n$ indicates 3:2 content (FILM) or 3:2 content in transition (FILM IN TRANSITION), then $\theta_n$ is used to output field pairs and set the progressive frame flag and the repeat first field flag for each field pair. Otherwise, standard video frame are paired for output.

SUMMARY

The invention described above thus overcomes the disadvantages of known methods by providing improved techniques for determining field differences, and for identifying progressive frames and repeated fields in video format, especially in cases where the source data is noisy, or where the data pattern is interrupted or otherwise altered. The detection of video format is advantageously improved compared to known methods.

While this invention has been described in various explanatory embodiments, other embodiments and variations can be effected by a person of ordinary skill in the art without departing from the scope of the invention. In particular, many of the features disclosed herein can be used in combination with other methods related to the detection of 3:2 pulldown or other data formats.

What is claimed is:

1. A method for detecting a format of a digital video data sequence, comprising:
   producing a normalized field difference sequence based on a comparison of two fields in a sequence of data fields wherein producing the normalized field difference sequence includes:
   segmenting a first field of digital video data into a first plurality of pixel groups;
   segmenting a second field of digital video data into a second plurality of pixel groups;
   producing a plurality of pixel group scores based on differences between corresponding pixel groups in the first plurality of pixel groups and the second plurality of pixel groups; and
   determining a field difference metric between the first field of digital video data and the second field of digital video based on the plurality of pixel group scores;
   comparing the normalized field differences sequence with at least one test vector; and
   determining whether the received sequence of data fields is film mode or video mode based on the comparison of the normalized field difference sequence with the at least one test vector wherein the at least one test vector includes a plurality of film basis vectors and a plurality of video basis vectors, wherein the plurality of film basis vectors have zero assigned to each film basis vector location representing a repeat field, and one assigned to each film basis vector.

2. The method of claim 1, wherein the first plurality of pixel groups include a first plurality of blocks, the second plurality of pixel groups include a second plurality of blocks, and the plurality of pixel group scores includes a plurality of block scores.

3. The method of claim 1, wherein determining whether the received sequence of data fields is film or video further includes comparing the normalized field difference sequence to a plurality of film splice vectors.

4. The method of claim 3, further comprising determining a phase index based on the comparison between the normalized field difference sequence and the plurality of film splice vectors.

5. The method of claim 1, further comprising determining a phase index based on the comparison of the normalized field difference sequence with the at least one test vector.

6. A method for detecting a format of a digital video data sequence, comprising:
producing a normalized field difference sequence based on a comparison of two fields in a sequence of data fields wherein producing the normalized field difference sequence includes:
segmenting a first field of digital video data into a first plurality of pixel groups;
segmenting a second field of digital video data into a second plurality of pixel groups;
producing a plurality of pixel group scores based on differences between corresponding pixel groups in the first plurality of pixel groups and the second plurality of pixel groups; and
determining a field difference metric between the first field of digital video data and the second field of digital video based on the plurality of pixel group scores;
comparing the normalized field differences sequence with at least one test vector; and
determining whether the received sequence of data fields is film mode or video mode based on the comparison of the normalized field difference sequence with the at least one test vector;
determining a phase index based on the comparison of the normalized field difference sequence with the at least one test vector;
identifying field pairs based on the determination of film mode and video mode, and further based on the determination of phase index;
setting repeat first field flags to selected fields in the sequence of data fields based on the determination of film mode and the video mode, and further based on the determination of phase index; and
setting progressive frame flags to selected fields in the sequence of data fields based on the determination of film mode and video mode, and further based on the determination of phase index.

7. A method for detecting a format of a digital video data sequence, comprising:
producing a normalized field difference sequence based on a comparison of two fields in a sequence of data fields;
comparing the normalized field difference sequence with a plurality of film splice vectors;
determining whether the sequence of data fields is film mode or video mode based on the comparison of the normalized field difference sequence with the plurality of film splice vectors;
determining a phase index based on the comparison between the normalized field difference sequence and the plurality of film splice vectors;
identifying field pairs based on the determination of film mode and video mode, and further based on the determination of phase index;
setting repeat first field flags to selected fields in the sequence of data fields based on the determination of film mode and video mode, and further bases on the determination of phase index; and
setting progressive frame flags to selected fields in the sequence of data fields based on the determination of film mode and video mode, and further bases on the determination of phase index.

8. A computer readable medium encoded with a program for detecting a format of a digital video data sequence, the program performing the steps of:
producing a normalized field difference sequence based on a comparison of two fields in a sequence of data fields wherein producing the normalized field difference sequence includes:
segmenting a first field of digital video data into a first plurality of pixel groups;
segmenting a second field of digital video data into a second plurality of pixel groups;
producing a plurality of pixel group scores based on differences between corresponding pixel groups in the first plurality of pixel groups and the second plurality of pixel groups; and
determining a field difference metric between the first field of digital video data and the second field of digital video based on the plurality of pixel group scores;
comparing the normalized field differences sequence with at least one test vector; and
determining whether the received sequence of data fields is film mode or video mode based on the comparison of the normalized field difference sequence with the at least one test vector wherein the at least one test vector includes a plurality of film basis vectors and a plurality of video basis vectors, wherein the plurality of film basis vectors have zero assigned to each film basis vector location representing a repeat field, and one assigned to each film basis vector.

9. A computer readable medium encoded with a program for detecting a format of a digital video data sequence, the program performing the steps of:
producing a normalized field difference sequence based on a comparison of two fields in a sequence of data fields wherein producing the normalized field difference sequence includes:
segmenting a first field of digital video data into a first plurality of pixel groups;
segmenting a second field of digital video data into a second plurality of pixel groups;
producing a plurality of pixel group scores based on differences between corresponding pixel groups in the first plurality of pixel groups and the second plurality of pixel groups; and
determining a field difference metric between the first field of digital video data and the second field of digital video based on the plurality of pixel group scores;
comparing the normalized field differences sequence with at least one test vector; and
determining whether the received sequence of data fields is film mode or video mode based on the comparison of the normalized field difference sequence with the at least one test vector
determining a phase index based on the comparison of the normalized field difference sequence with the at least one test vector;
identifying field pairs based on the determination of film mode and video mode, and further based on the determination of phase index;
setting repeat first field flags to selected fields in the sequence of data fields based on the determination of film mode and the video mode, and further based on the determination of phase index; and setting progressive frame flags to selected fields in the sequence of data fields based on the determination of film mode and video mode, and further based on the determination of phase index.

10. A computer readable medium encoded with a program for detecting a format of a digital video data sequence, the program performing the steps of:

producing a normalized field difference sequence based on a comparison of two fields in a sequence of data fields;

comparing the normalized field difference sequence with a plurality of film splice vectors;

determining whether the sequence of data fields is film mode or video mode based on the comparison of the normalized field difference sequence with the plurality of film splice vectors;

determining a phase index based on the comparison between the normalized field difference sequence and the plurality of film splice vectors;

identifying field pairs based on the determination of film mode and video mode, and further based on the determination of phase index;

setting repeat first field flags to selected fields in the sequence of data fields based on the determination of film mode and video mode, and further bases on the determination of phase index; and setting progressive frame flags to selected fields in the sequence of data fields based on the determination of film mode and video mode, and further bases on the determination of phase index.

\* \* \* \* \*